Patented Dec. 2, 1952

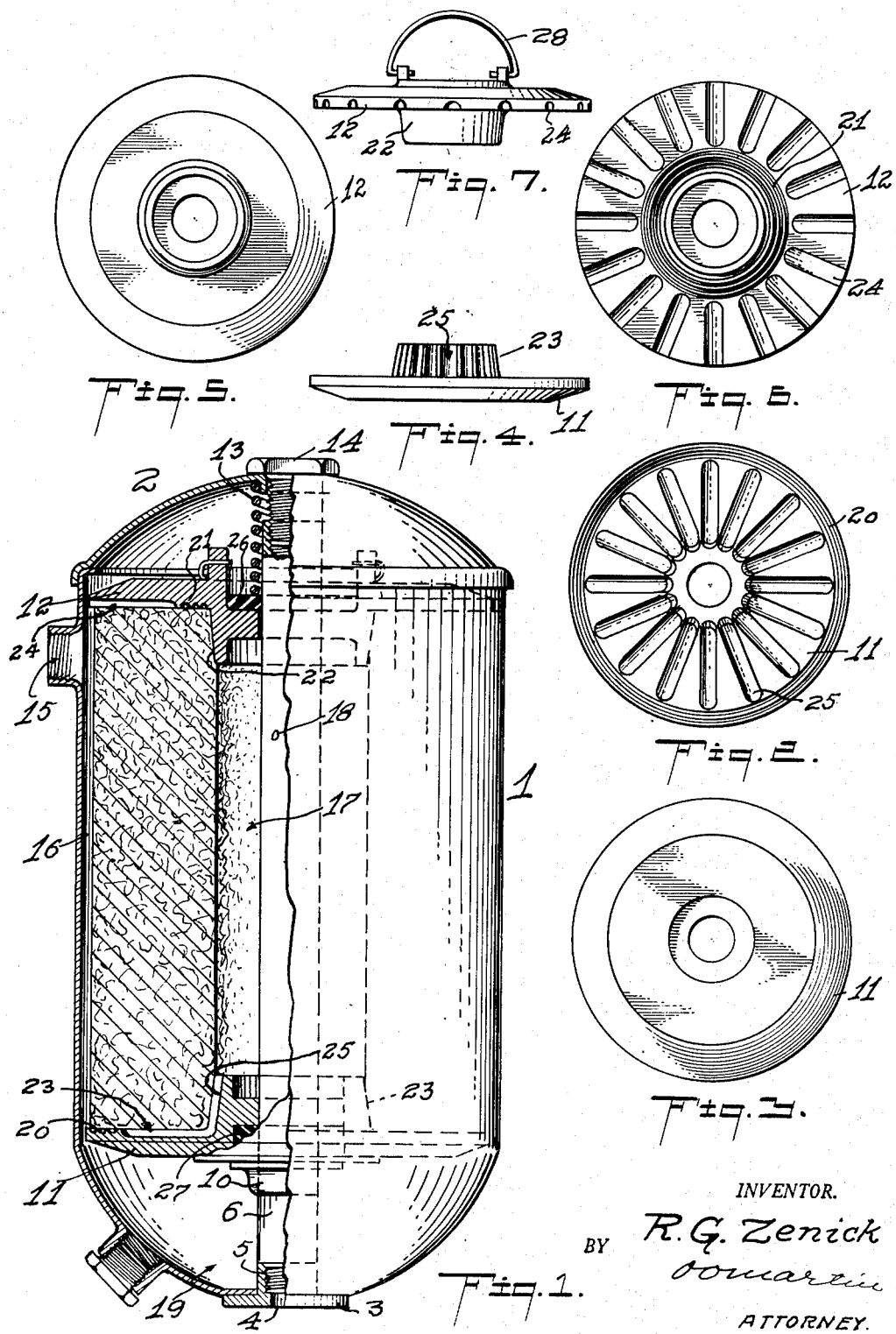

2,620,071

UNITED STATES PATENT OFFICE 2,620,071

OIL FILTER CARTRIDGE MOUNTING

Raymond G. Zenick, Burbank, Calif.

Application January 31, 1949, Serial No. 73,775

4 Claims. (Cl. 210—164)

This invention relates to oil filters for internal combustion engines, air compressors and the like and refers particularly to improved means for mounting the filter pack within the casing of such filter.

In the present-day practice, oil filters generally consist of a metal casing within which a cartridge is seatable and this cartridge conventionally consists of a cylindrical inner casing within which the filter pack is fully enclosed. The disadvantage of this type of filter construction is that when the filter pack becomes saturated with the gritty impurities which is designed to filter out, it becomes necessary not only to discard the filter pack but also the cartridge within which it is mounted.

In view of the foregoing, it is the general object of the present invention to provide a filter combination within which the filter pack forms a separate unit which may be mounted within the filter casing and from which it may be removed for replacement by a new pack without having to discard any other part of the filter. A considerable saving is in this manner effected without, in any way, reducing the effectiveness of the filtering operations. It is a further object of the invention to provide a novel, highly efficient and inexpensive filter pack.

The advantages of the present invention will be better understood from the following detailed description and reference is invited to the accompanying drawings in which a preferred form of the invention is illustrated.

In the drawings:

Fig. 1 is a side elevational view of an oil filter embodying the invention and with a portion of the casing thereof broken away for the sake of clearness;

Figs. 2 and 3 are, respectively, a top and bottom view of the lower support for the filter pack;

Fig. 4 is a substantially corresponding side view of this support;

Fig. 5 is a plan view of the upper member of the filter pack mounting;

Fig. 6 is an inverted plan view of this mounting; and

Fig. 7 is a substantially corresponding side elevational view thereof.

Referring in the first instance to Fig. 1, the numeral 1 denotes a cylindrical casing such as conventionally used in oil filters. This casing is open at the top and a tightly fitting cover 2 is provided to seal the top of the casing after the filter pack has been mounted therein. In the bottom of the casing is tightly seated a plug 3, through the center of which is cut a discharge passage 4. This plug is provided with internal screw threads 5 of a size to receive therein the threaded end of a tubular stem 6 rising through the casing and projecting a distance above the upper end thereof. Once this stem has been seated in the plug 3, it remains permanently in position therein to support the filter pack which is mounted in the manner which will now be described.

An annular shoulder 10 is rigidly mounted on the stem 6 a distance above the bottom of the casing to provide a support for the lower pack supporting member 11, which latter is slidably mounted on the stem and placed in position thereon before the pack is lowered into the casing. The upper pack mounting element 12 is placed in position on the stem after the filter pack has been seated on the member 11 and a compression spring 13 is mounted on the stem to project a distance above the upper end thereof, substantially as indicated in the drawing. The cover 2 may then be placed in position to close the upper end of the casing and a screw plug 14 is inserted through a perforation in the top of the cover to engage internal screw threads within the upper end of the stem thereby to clamp the cover rigidly and tightly in position on the casing.

Oil under pressure is, while the engine is running, forced through an inlet passage 15 into an annular chamber 16, formed between the outer surface of the filter pack and the wall of the casing, gradually to enter into and to flow through the pack into a cylindrical inner space 17 formed between the pack and the stem 6. The filtered oil rises within this space until it reaches an aperture 18, through which it passes into the interior of the stem by gravity to discharge through the opening 4 of the bottom plug 3 for return to the engine. It is noticed that a space 19 is provided within the bottom of the casing and that the incoming oil is free to pass into this space for the purpose of heating the lower part of the casing, the bottom support member 11 and the lower portion of the stem 6. This is found advantageous for the reason that such heating expedites the flow of the oil through the filter pack.

The lower support member 11 and the upper mounting member 12 are so shaped that they will tightly enclose the filter pack therebetween and so prevent a leakage of oil. The lower member 11 is, for this purpose, made in the upper surface thereof adjacent to the outer periphery of the member with a series of circular ribs 20 rising therefrom to enter into the softer material of the filter pack and so to form a tight joint at the outer surface thereof. The upper mounting member 12 is similarly made with a plurality of circular ridges 21 at the inner end thereof adjacent a pendent shoulder 22 which serves to maintain the filter pack axially aligned with the stem 6 and the cylindrical space within the casing. The lower member 11 is similarly fitted with a shoulder 23 rising into the space within the filter pack for the same purpose. The upper member is made with a plurality of equidistantly spaced radially directed grooves 24, through which the oil is free to flow into the upper surface of the filter pack. Similar grooves 25 extend radially inward from the circular ribs 20 and along the shoulder 23 into the inner space 17.

The spring 13 applies sufficient pressure to the upper mounting member 12 to maintain the filter pack firmly and tightly seated between the circular ridges of the two members and suitable gaskets 26, 27 are provided more securely to insure tight joints between the mounting members and the stem 6.

It is found that, in most filters such as commercially used at the present time, the oil pressure is insufficient to produce a flow through the filter pack of sufficient volume to serve the engine. It is, for this reason, accepted practice to provide in the bottom plate of the cartridge one or more openings through which some of the unfiltered oil may pass into the space within the filter pack, there to become mixed with the filtered oil rising through this space and to flow therewith back to the engine. This is a most unsatisfactory condition which apparently cannot be avoided where the conventional type of filter pack is used.

It was above stated that an important object of the present invention is the provision of a novel type of filter pack. This pack consists of a roll of tissue paper, such as ordinary toilet paper, through the spaces between each layer of which the oil from the upper radial grooves 24 is free to pass, there to deposit all grit and other undesirable matter. The filtered oil is free to pass through the thin films of the tissue paper windings into the inner space 17 and to discharge into the radial grooves 25 of the lower support member 11, finally to rise through these grooves into the inner space 17.

The advantage of using such tissue paper roll is not only that a filter pack is provided through which a sufficient flow of filtered oil is obtained even at relatively low pressure, but equally as much that such filter pack is so extremely economical to use.

When it is desired to remove the filter pack, it is merely required to unscrew the plug 14, remove the cover 2 and the spring 13 and to lift the upper mounting member out of the casing. The latter may, for this purpose, conveniently be fitted with a pivotally seated handle 28. The filter pack may then be removed from the casing and a new pack substituted, whereupon the parts again are reinserted and the cover clamped into position. Anyone, even the average motorist or engine attendant can perform these operations and so eliminate considerable expense.

The drawings are merely illustrative of my invention and no attention is paid to exact proportioning. It may, for example, be found that the film pack, as it becomes saturated expands somewhat radially. It is, for this reason, necessary that the outer annular chamber be made wide enough to allow of such expansion. Other modifications may be introduced within the scope of the claims hereto appended.

I claim:

1. In an oil filter, the combination with a conventional cylindrical filter casing having an oil inlet through its outer wall, a cover and a tubular stem axially rising from the bottom thereof, said stem having an inlet passage nearer the top thereof and a bottom outlet; of an annular shoulder on the stem near the bottom thereof, a coaxial annular support seatable on said annular shoulder, a tubular filter pack coaxially seatable on said support in spaced relation to said casing and stem, the support having circular ridges rising from the top thereof at its outer periphery indenting the bottom surface of the filter pack and radial grooves extending from said ridges to the space within the pack, a coaxial annular disc seatable on the stem above the inlet passage thereof to cover the top surface of the filter pack, said disc having circular ridges rising from the bottom surface thereof at its inner periphery and radial grooves extending from its ridges to the outer periphery thereof, a helical compression spring on the stem resting on said disc, and means engaging the stem to clamp the cover in position and to compress said spring.

2. In an oil filter, the combination with a conventional cylindrical filter casing having an oil inlet through its outer wall a cover and a tubular stem axially rising from the bottom thereof, said stem having an inlet passage nearer the top thereof and a bottom outlet; of an annular shoulder on the stem near the bottom thereof, a coaxial annular support seatable on said annular shoulder, a tissue paper roll coaxially seatable on said support in spaced relation to said casing and stem, the support having circular ridges rising from the top thereof at its outer periphery indenting the bottom surface of the paper roll and radial grooves extending from said ridges to the space within the pack, a coaxial annular disc seatable on the stem above the inlet passage thereof to cover the top surface of the paper roll, said disc having circular ribs rising from the bottom surface thereof at its inner periphery and radial grooves extending from said ribs to the outer periphery thereof, a helical compression spring on the stem resting on said disc, and means engaging the stem to clamp the cover in position and to compress said spring.

3. In an oil filter, the combination with a conventional cylindrical filter casing having an oil inlet through its outer wall a cover and a tubular stem axially rising from the bottom thereof, said stem having an inlet passage nearer the top thereof and an outlet at the bottom; of an annular shoulder on the stem near the bottom thereof, a coaxial annular support disc seatable on said annular shoulder, a tubular filter pack coaxially seatable on said support disc in spaced relation to said casing and stem, the outer portion of the disc indenting the end of the pack to check passage of oil therebetween, a coaxial annular disc seatable on the stem to cover the top surface of the filter pack, the inner portion of said upper disc indenting the pack to check passage therebetween of oil descending from said casing inlet along the outer surface of the pack, a helical compression spring on the stem resting on said disc, and means engaging the stem to clamp the cover in position and to compress said spring.

4. In an oil filter, the combination with a conventional cylindrical filter casing having an oil inlet through its outer wall a cover and a tubular stem axially rising from the bottom thereof, said stem having an inlet passage nearer the top thereof and an outlet at the bottom thereof; of an annular shoulder on the stem near the bottom thereof, a coaxial annular support disc seatable on said annular shoulder, a roll of tissue paper coaxially seatable on said support disc in spaced relation to said casing and stem, the outer portion of the support disc indenting the bottom surface of the roll to check passage therebetween of oil descending from said casing inlet along the outer surface of the roll of paper, a coaxial annular disc seatable on the stem to cover the top surface of the paper roll, the inner portion of said upper disc indenting the top surface of the roll to check passage of oil therethrough, a helical compression spring on the stem resting on said disc, and means engaging the stem to clamp the cover in position and to compress said spring.

RAYMOND G. ZENICK.

REFERENCES CITED

The following references are of record in the file of this patent:

UNITED STATES PATENTS

| Number | Name | Date |
|---|---|---|
| 165,377 | Sinclaire | July 6, 1875 |
| 781,018 | Palmer | Jan. 31, 1905 |
| 2,079,910 | Kamrath | May 11, 1937 |
| 2,110,009 | Wiedenbacker | Mar. 1, 1938 |
| 2,218,339 | Manning | Oct. 15, 1940 |
| 2,325,399 | Houston | July 27, 1943 |
| 2,327,011 | Bolser | Aug. 17, 1943 |
| 2,427,733 | McCann | Sept. 23, 1943 |
| 2,512,797 | Harvuot | July 27, 1950 |